UNITED STATES PATENT OFFICE.

CARL OSCAR MÜLLER AND ALEXANDER OTTO, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED AZO DYE.

No. 888,837.   Specification of Letters Patent.   Patented May 26, 1908.

Application filed April 23, 1907. Serial No. 369,852. (Specimens.)

*To all whom it may concern:*

Be it known that we, CARL OSCAR MÜLLER, Ph. D., and ALEXANDER OTTO, Ph. D., chemists, citizens of the Empire of Germany, and residing at Höchst-on-the-Main, Germany, have invented certain Improvements in Making Red Azo Dyestuffs, of which the following is a specification.

We have found that valuable substantive disazo dyestuffs may be obtained, if the dyestuffs having the general formula: diazo compound + para-aminobenzoyl-2.5.7-aminonaphtholsulfonic acid be further diazotized and combined with one molecular proportion of 2.5.7-aminonaphtholsulfonic acid, wherein one hydrogen atom of the amido group may be replaced by an acidyl-residue. As acidyl rest is to be considered, for instance, the formyl group, the acetyl group or carbamic acid and the like. As diazo-compounds may be used those of primary bases, their sulfo- and carboxylic acids. The process may be carried out, for instance, as follows:—

Example I: The dyestuff from 9.3 kil. of anilin and 38 kil. of para-aminobenzoyl-2.5.7-aminonaphthol sulfonic acid is stirred into a thin paste, 8 kil. of nitrite being dissolved therein. 35 kil. of hydrochloric acid of 30 per cent. strength are then allowed to run in so that the temperature is maintained at 18–20° C. The whole is well stirred for 1 hour and the diazo compound thus formed is allowed to run into a solution of 30 kil. of 2.5.7-aminonaphtholsulfonic acid and 35 kilo. of sodium carbonate. After 27 hours the formation of the dyestuff is complete. It is salted out, filtered, pressed and dried. The dyestuff is a greenish powder, readily soluble in hot water with a red color, dyeing cotton red shades.

Example II: The process is the same as in example I while substituting for the amidonaphthol sulfonic acid 2.5.7 serving as final component, 33 kil. of its derivative formylated in the amido group.

Example III: 24 kil. of free 2.5.7-aminonaphtholsulfonic acid are stirred in 250 kil. of water, 20 kil. of potassium cyanate being added. The whole is slowly heated to 40° so that solution sets in after some hours. It is then cooled to 20° C., 8 kil. of glacial acetic acid being added. After 27 hours no free aminonaphtholsulfonic acid can be traced and the formation of the unsymmetrical urea $C_{10}H_5.OH(5)SO_3Na(7)NH.CO.NH_2(2)$ is complete. There are then added 35 kil. of sodium carbonate to which is allowed to run the diazo compound of the dyestuff obtained from 10 kil. of ortho-toluidin and 38 kil. of para-aminobenzoyl-2.5.7-aminonaphthol sulfonic acid. After 24 hours the formation of the dyestuff is complete. It is salted out, filtered, pressed and dried. For toluidin, anilin and xylidin may be substituted of which the former yields somewhat yellower, the latter somewhat bluer red shades than those obtained by the dyestuff from toluidin. This holds good for the sulfonic- and carboxylic acids of said bases.

Having described our invention, what we claim is:—

1. The herein described process of making disazo dyestuffs, which consists in further diazotizing the dyestuffs from a diazo compound and para-aminobenzoyl-2.5.7-aminonaphtholsulfonic acid and in combining them with 2.5.7-aminonaphtholsulfonic acid wherein for one hydrogen atom of the free amido group may be substituted an acidyl-residue.

2. As new products, red dyestuffs having the formula diazo compound + para-aminobenzoyl-2.5.7-aminonaphtholsulfonic acid + 2.5.7-aminonaphtholsulfonic acid, wherein for one hydrogen atom of the free amino group may be substituted an acidyl residue, being in a solid state greenish powders, soluble in hot water and sulfuric acid with a red color, dyeing unmordanted cotton red tints.

In testimony, that we claim the foregoing as our invention, we have signed our names in presence of two subscribing witnesses.

CARL OSCAR MÜLLER.
ALEXANDER OTTO.

Witnesses:
JEAN GRUND,
CARL GRUND.